United States Patent
Lakus-Becker et al.

(10) Patent No.: US 8,917,776 B2
(45) Date of Patent: Dec. 23, 2014

(54) RATE-DISTORTION CONTROL IN DVC WITH NO FEEDBACK CHANNEL

(75) Inventors: Axel Lakus-Becker, Artarmon (AU); Ka-Ming Leung, Marsfield (AU)

(73) Assignee: Canon Kabushiki Kaisha, Tokyo (JP)

( * ) Notice: Subject to any disclaimer, the term of this patent is extended or adjusted under 35 U.S.C. 154(b) by 567 days.

(21) Appl. No.: 12/604,760

(22) Filed: Oct. 23, 2009

(65) Prior Publication Data

US 2010/0111198 A1 May 6, 2010

(30) Foreign Application Priority Data

Oct. 31, 2008 (AU) .............................. 2008240343

(51) Int. Cl.
| | | |
|---|---|---|
| H04N 7/12 | (2006.01) | |
| H04N 11/02 | (2006.01) | |
| H04N 11/04 | (2006.01) | |
| H04N 19/89 | (2014.01) | |
| H04N 19/61 | (2014.01) | |
| H04N 7/68 | (2006.01) | |
| H04N 19/30 | (2014.01) | |
| H04N 19/64 | (2014.01) | |
| H04N 19/115 | (2014.01) | |

(52) U.S. Cl.
CPC .......... *H04N 19/00933* (2013.01); *H04N 7/50* (2013.01); *H04N 7/68* (2013.01); *H04N 19/00466* (2013.01); *H04N 19/00842* (2013.01); *H04N 19/0006* (2013.01)
USPC ................. 375/240.27; 375/240.01

(58) Field of Classification Search
CPC .................. H04N 7/50; H04N 7/68

USPC ....................................................... 375/240.27
See application file for complete search history.

(56) References Cited

U.S. PATENT DOCUMENTS

| | | | | |
|---|---|---|---|---|
| 6,651,210 | B1 | 11/2003 | Trott et al. | 714/758 |
| 7,388,521 | B2 * | 6/2008 | Lu et al. | 341/51 |
| 7,414,549 | B1 * | 8/2008 | Yang et al. | 341/50 |
| 7,995,649 | B2 * | 8/2011 | Zuo et al. | 375/240.03 |
| 8,073,052 | B1 * | 12/2011 | Xu et al. | 375/240.03 |
| 2003/0128749 | A1 * | 7/2003 | Bruas | 375/222 |
| 2005/0111548 | A1 * | 5/2005 | Lee et al. | 375/240.12 |
| 2005/0185714 | A1 * | 8/2005 | Lin et al. | 375/240.12 |

(Continued)

FOREIGN PATENT DOCUMENTS

| | | |
|---|---|---|
| WO | WO 2005/120079 A2 | 12/2005 |
| WO | WO 2006/022156 A1 | 3/2006 |

OTHER PUBLICATIONS

Marleen Morbee, et al., "Rate Allocation Algorithm for Pixel-Domain Distributed Video Coding Without Feedback Channel", Speech and Signal Processing (ICASSP 2007), Hawaill, USA, Apr. 2007, IEEE: USA, pp. 521-524.*

(Continued)

*Primary Examiner* — Chikaodili E Anyikire
(74) *Attorney, Agent, or Firm* — Fitzpatrick, Cella, Harper & Scinto

(57) ABSTRACT

A method of determining bit rates for use in encoding video data for joint decoding, is disclosed. An approximation of the video data is generated for later use as side information during a process of joint decoding. Bit error probabilities are determined for each bit plane and for each coefficient band of the approximation. The bit rates are determined for encoding the bit planes depending on the bit error probabilities, bit planes, and coefficient bands.

18 Claims, 8 Drawing Sheets

(56) References Cited

U.S. PATENT DOCUMENTS

| | | | | |
|---|---|---|---|---|
| 2005/0268200 | A1* | 12/2005 | Garudadri et al. | 714/746 |
| 2006/0048038 | A1 | 3/2006 | Yedidia et al. | 714/793 |
| 2006/0197690 | A1 | 9/2006 | Liu et al. | |
| 2007/0013561 | A1* | 1/2007 | Xu et al. | 341/50 |
| 2007/0253479 | A1* | 11/2007 | Mukherjee | 375/240.1 |
| 2008/0031344 | A1* | 2/2008 | Lu et al. | 375/240.19 |
| 2008/0069242 | A1* | 3/2008 | Xu et al. | 375/240.24 |
| 2008/0291065 | A1* | 11/2008 | Lu et al. | 341/107 |
| 2009/0031191 | A1* | 1/2009 | Yang et al. | 714/758 |
| 2009/0147841 | A1* | 6/2009 | Chang et al. | 375/240.01 |
| 2009/0228757 | A1* | 9/2009 | Nishi | 714/752 |
| 2009/0316783 | A1* | 12/2009 | Au et al. | 375/240.15 |
| 2009/0316797 | A1* | 12/2009 | Woo et al. | 375/240.25 |
| 2010/0080289 | A1* | 4/2010 | Jeon et al. | 375/240.03 |
| 2010/0111198 | A1* | 5/2010 | Lakus-Becker et al. | 375/240.27 |

OTHER PUBLICATIONS

Aug. 22, 2011 Examiner's Second Report in Australian Patent Appln. No. 2008240343.

Catarina Brites, et al., "Encoder Rate Control for Transformation Domain Wyner-Ziv Video Coding", Proceedings from IEEE International Conference on Image Processing, San Antonio, Texas, USA, Sep. 2007, IEEE: USA, pp. 5-8.

Marleen Morbée, et al., "Rate Allocation Algorithm for Pixel-Domain Distributed Video Coding Without Feedback Channel", Speech and Signal Processing (ICASSP 2007), Hawaii, USA, Apr. 2007, IEEE: USA, pp. 521-524.

David P. Varodayan, "Wyner-Ziv Coding of Still Images with Rate Estimation at the Encoder", Department of Electrical Engineering, Stanford University, Stanford, 2004 (not published).

Yoshihide Tonomura, et al., "Efficient Index Assignment by Improved Bit Probability Estimation for Processing of Distributed Video Coding", ICASSP 2008, Las Vegas, USA, pp. 701-704.

Denis Kubasov, et al. "A Hybrid Encoder/Decoder Rate Control for Wyner-Ziv Video Coding with a Feedback Channel", IEEE Multimedia Signal Processing Workshop, IEEE 9th Workshop on Multimedia Signal Processing 2007, Chania, Crete, Oct. 1-3, 2007, pp. 251-254.

Jun. 29, 2010 Examiner's First Report in Australian Patent Appln. No. 2008240343.

Apr. 4, 2012 Australian Notice of Acceptance in Australian Patent Appln. No. 2008240343.

Anne Aaron, et al., "Wyner-Ziv Coding of Motion Video", IEEE, Signals, Systems and Computers, 2002, Conference of Record of the Thirty-Sixth Asilomar Conference, vol. 1, pp. 240-244, Nov. 3, 2002.

* cited by examiner

RATE-DISTORTION CONTROL IN DVC WITH NO FEEDBACK CHANNEL

FIELD OF THE INVENTION

The present invention relates generally to video encoding and decoding and, in particular, to a method and apparatus for determining bit rates for use in rate control in distributed video coding systems.

BACKGROUND

Various products, such as digital cameras and digital video cameras, are used to capture images and video. These products contain an image sensing device, such as a charge coupled device (CCD), which is used to capture light energy focussed on the image sensing device. The captured light energy, which is indicative of a scene, is then processed to form a digital image. Various formats are used to represent such digital images, or videos. Formats used to represent video include Motion JPEG, MPEG2, MPEG4 and H.264.

All the formats listed above are compression formats which offer high quality and improve the number of video frames that can be stored on a given media. However, the above formats all have long encoding runtimes.

A complex encoder requires complex hardware. Complex encoding hardware has a high design and manufacturing cost, as well as a relatively large physical size. Furthermore, long encoding runtimes delay the rate at which video frames can be captured while not overflowing a temporary buffer. Additionally, more complex encoding hardware has higher battery consumption.

Wyner Ziv coding or "distributed video coding" is a form of coding where an input video stream is usually split into key frames and non-key frames. The key frames are compressed using a conventional coding scheme, such as Motion JPEG, MPEG2, MPEG4 or H.264, and the decoder conventionally decodes the key frames. The key frames are used to predict the non-key frames. The decoder essentially performs motion estimation which is usually performed at the encoder. The predicted non-key frames are improved in terms of visual quality with the information the encoder is providing for the non-key frames.

The visual quality of the decoded video stream depends heavily on the quality of the prediction of the non-key frames and the level of quantization to the image pixel values. The prediction is often a rough estimate of the original frame, generated from sub-sampled images and/or adjacent frames, e.g., through motion estimation and interpolation. The mismatch between the prediction and the decoded values are corrected by channel coding techniques such as the generation of parity bits. Each parity bit carries some information about one or more information bits in the original frames. The bit rate of this parity bit stream can vary to achieve a given rate-distortion performance desirable for specific applications.

Feedback channels are often employed to perform rate-distortion in distributed video coding systems. An encoder typically generates the parity bit stream and temporarily stores the generated bit stream in a buffer for later transmission. Initially, a small amount of parity bits are transmitted to the decoder for error correction. If decoding is unsuccessful, the decoder requests more parity bits from the encoder through the feedback channel, and the decoding process restarts. The decoder continues to request more parity bits until the decoder accumulates a sufficient amount of parity bits to correct the bit errors in the prediction. However, the multiple requests result in a long decoding time. Further, the decoder is relatively complex.

As an alternative to having a feedback channel, some recent distributed video coding systems implement a rate estimation function to control the bit rate of the parity bits. The rate estimation function typically involves the computation of bit error probability and conditional entropy probability per bit plane basis under the assumption of a well-defined noise distribution model (e.g., Laplacian). A disadvantage of this rate estimation function is that it relies too much on the assumption of the underlying noise distribution model. The parameters of a noise distribution model have significant impact on the performance of the system. Any inaccuracy of the estimated noise parameters may lead to poor decoding performance. For good performance, the noise parameters need to be estimated online and to be computed for each bit plane. This significantly increases the complexity of the encoder and defeats the purpose of a simple encoder behind distributed video coding.

SUMMARY

It is an object of the present invention to substantially overcome, or at least ameliorate, one or more disadvantages of existing arrangements.

According to one aspect of the present invention, there is provided a computer implemented method of determining bit rates for use in encoding video data for joint decoding, said method comprising the steps of:

generating an approximation of the video data for later use as side information during a process of joint decoding;

determining bit error probabilities for each bit plane and for each coefficient band of said approximation; and determining the bit rates for encoding said bit planes depending on said bit error probabilities, bit planes, and coefficient bands, the determined bit rates being stored in a computer readable medium.

According to another aspect of the present invention, there is provided an apparatus for determining bit rates for use in encoding video data for joint decoding, said apparatus comprising:

approximation generating module for generating an approximation of the video data for later use as side information during a process of joint decoding;

bit error probability determining module for determining bit error probabilities for each bit plane and for each coefficient band of said approximation; and bit rate determining module for determining the bit rates for encoding said bit planes depending on said bit error probabilities, bit planes, and coefficient bands.

According to still another aspect of the present invention, there is provided a computer readable medium, having a program recorded thereon, where the program is configured to make a computer execute a procedure for determining bit rates for use in encoding video data for joint decoding, said method comprising the steps of:

code for generating an approximation of the video data for later use as side information during a process of joint decoding;

code for determining bit error probabilities for each bit plane and for each coefficient band of said approximation; and code for determining the bit rates for encoding said bit planes depending on said bit error probabilities, bit planes, and coefficient bands.

According to still another aspect of the present invention, there is provided a system for determining bit rates for use in encoding video data for joint decoding, said system comprising:

a memory for storing data and a computer program; and a processor coupled to said memory executing said computer program, said computer program comprising instructions for:

generating an approximation of the video data for later use as side information during a process of joint decoding;

determining bit error probabilities for each bit plane and for each coefficient band of said approximation; and determining the bit rates for encoding said bit planes depending on said bit error probabilities, bit planes, and coefficient bands.

Other aspects of the invention are also disclosed.

BRIEF DESCRIPTION OF THE DRAWINGS

One or more embodiments of the present invention will now be described with reference to the drawings, in which.

DETAILED DESCRIPTION

Figure 1:
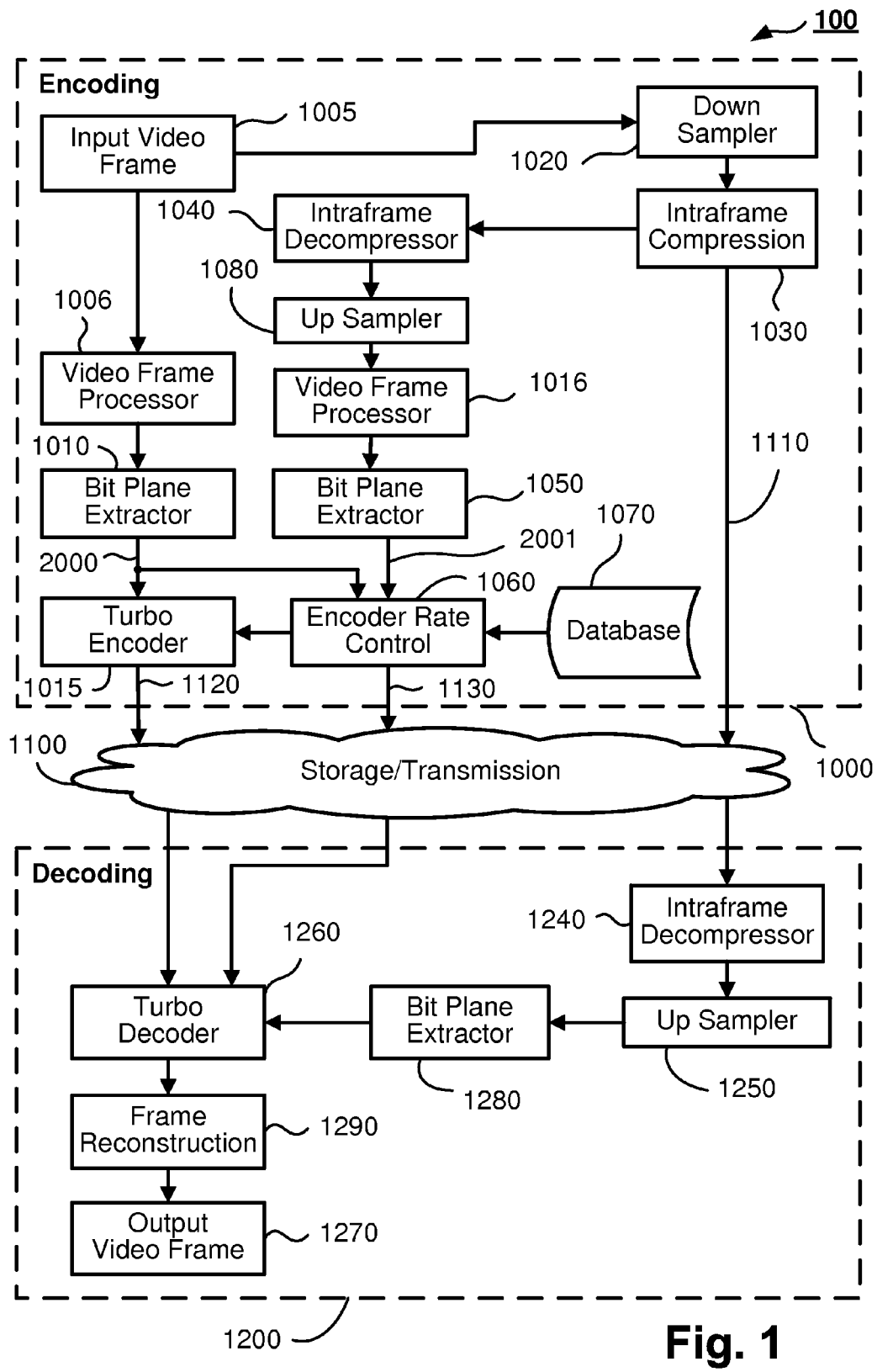
FIG. 1 is a schematic block diagram of a system for encoding an input video, for transmitting or storing the encoded video, and for decoding the video, according to an exemplary embodiment.

Where reference is made in any one or more of the accompanying drawings to steps and/or features, which have the same reference numerals, those steps and/or features have for the purposes of this description the same function(s) or operation(s), unless the contrary intention appears.

FIG. 1 shows a schematic block diagram of a system 100 for performing distributed video encoding on an input video, for transmitting or storing the encoded video and for decoding the video, according to an exemplary embodiment. The system 100 includes an encoder 1000 and a decoder 1200 interconnected through a storage or transmission medium 1100. The encoder 1000 forms two independently encoded bit streams 1110 and 1120, which are jointly decoded by the decoder 1200. In addition, the encoder 1000 generates a third bit stream 1130, which contains rate control information to be used by the decoder 1200 to facilitate turbo decoding.

Figure 4:
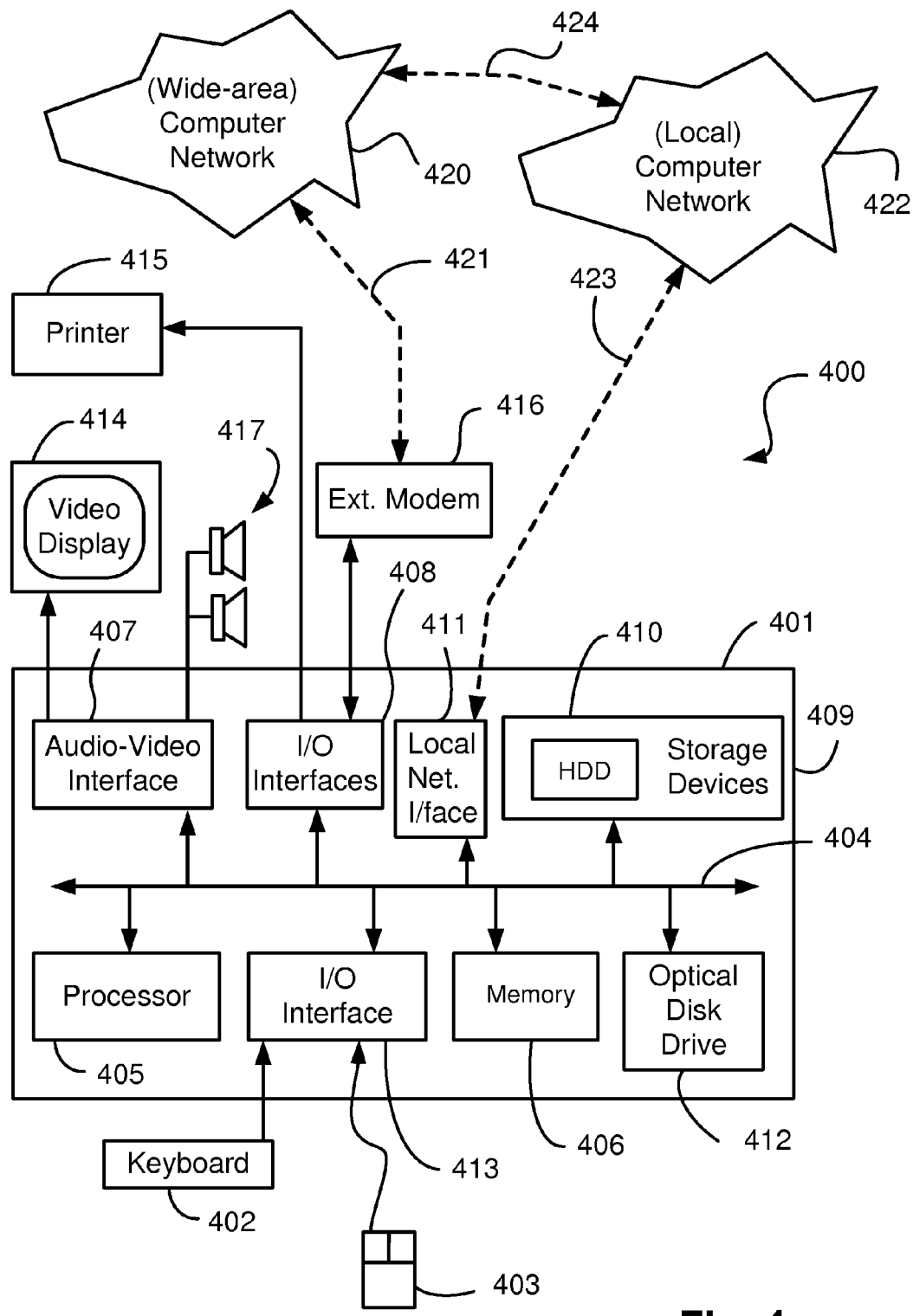
FIG. 4 shows a schematic block diagram of a computer system in which the system shown in FIG. 1 may be implemented.

The components 1000, 1100 and 1200 of the system 100 shown in FIG. 1 may be implemented using a computer system 400, such as that shown in FIG. 4, wherein the encoder 1000 and decoder 1200 may be implemented as software, such as one or more application programs executable within the computer system 400.

As described below, the encoder 1000 comprises a plurality of other software modules 1005, 1006, 1010, 1015, 1020, 1030, 1040, 1080, 1016, 1050, 1060, and 1070, each performing specific functions. Similarly, the decoder 1200 comprises a plurality of other software modules 1240, 1250, 1280, 1260, 1290, and 1270, each performing specific functions.

The software may be stored in a computer readable medium, including the storage devices described below, for example. The software is loaded into the computer system 400 from the computer readable medium, and is then executed by the computer system 400. A computer readable medium having such software or computer program recorded on it is a computer program product. The use of the computer program product in the computer system 400 preferably effects an advantageous apparatus for implementing the described methods.

As shown in FIG. 4, the computer system 400 is formed by a computer module 401, input devices such as a keyboard 402 and a mouse pointer device 403, and output devices including a printer 415, a display device 414 and loudspeakers 417. An external Modulator-Demodulator (Modem) transceiver device 416 may be used by the computer module 401 for communicating to and from a communications network 420 via a connection 421. The network 420 may be a wide-area network (WAN), such as the Internet or a private WAN. Where the connection 421 is a telephone line, the modem 416 may be a traditional "dial-up" modem. Alternatively, where the connection 421 is a high capacity (e.g., cable) connection, the modem 416 may be a broadband modem. A wireless modem may also be used for wireless connection to the network 420.

The computer module 401 typically includes at least one processor unit 405, and a memory unit 406 for example formed from semiconductor random access memory (RAM) and read only memory (ROM). The module 401 also includes a number of input/output (I/O) interfaces including an audio-video interface 407 that couples to the video display 414 and loudspeakers 417, an I/O interface 413 for the keyboard 402 and mouse 403, and an interface 408 for the external modem 416 and printer 415. In some implementations, the modem 416 may be incorporated within the computer module 401, for example within the interface 408. The computer module 401 also has a local network interface 411 which, via a connection 423, permits coupling of the computer system 400 to a local computer network 422, known as a Local Area Network (LAN). As also illustrated, the local network 422 may also couple to the wide network 420 via a connection 424, which would typically include a so-called "firewall" device or similar functionality. The interface 411 may be formed by an Ethernet™ circuit card, a wireless Bluetooth™ or an IEEE 802.11 wireless arrangement.

The interfaces 408 and 413 may afford both serial and parallel connectivity, the former typically being implemented according to the Universal Serial Bus (USB) standards and having corresponding USB connectors (not illustrated). Storage devices 409 are provided and typically include a hard disk drive 410. Other devices such as a floppy disk drive (not illustrated) and a magnetic tape drive (not illustrated) may also be used. An optical disk drive 412 is typically provided to act as a non-volatile source of data. Portable memory devices, such as optical disks (e.g., CD-ROM, DVD), USB-RAM, and floppy disks for example may then be used as appropriate sources of data to the system 400. The components 405 to 413 of the computer module 401 typically communicate via an interconnected bus 404 and in a manner which results in a conventional mode of operation of the computer system 400 known to those in the relevant art. Examples of computers on which the described arrangements can be practiced include IBM-PC's and compatibles, Sun Sparcstations, Apple Mac™, or alike computer systems evolved therefrom.

Typically, the application programs discussed above are resident on the hard disk drive 410 and are read and controlled in execution by the processor 405. Intermediate storage of such programs and any data fetched from the network 420 and 422 may be accomplished using the semiconductor memory 406, possibly in concert with the hard disk drive 410. In some instances, the application programs may be supplied to the user encoded on one or more CD-ROM and read via the corresponding drive 412, or alternatively may be read by the user from the networks 420 or 422. Still further, the software can also be loaded into the computer system 400 from other computer readable media. Computer readable media refers to any storage medium that participates in providing instructions and/or data to the computer system 400 for execution and/or processing. Examples of such media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 401. Examples of computer readable transmission media that may also participate in the provision of instructions and/or data include radio or infra-red transmission channels as well as a network connection to another computer or networked device, and the Internet or Intranets including e-mail transmissions and information recorded on Websites and the like.

The system 100 shown in FIG. 1 may alternatively be implemented in dedicated hardware such as one or more integrated circuits. Such dedicated hardware may include graphic processors, digital signal processors, or one or more microprocessors and associated memories.

In one implementation, the encoder 1000 and decoder 1200 are implemented within a camera (not illustrated), wherein the encoder 1000 and the decoder 1200 may be implemented as software being executed by a processor of the camera, or may implemented using hardware within the camera.

In a second implementation, only the encoder 1000 is implemented within a camera, wherein the encoder 1000 may be implemented as software executing in a processor of the camera, or implemented using hardware within the camera.

Referring again to FIG. 1, video data representing a video frame 1005 is received as input to the system 100. Preferably every input video frame 1005 is processed by the system 100. In an alternative embodiment only every fifth input video frame is encoded using the system 100. In yet another alternative embodiment, a selection of input video frames 1005 is made from the input video, with the selection of the input video frame 1005 depending on the video content. For example, if an occlusion of an object represented in the input video is observed, and if the extent of the observed occlusion is found to be above a threshold, then the input video frame 1005 is encoded using the system 100.

The encoder 1000 of FIG. 1 receives video data representing an input video frame 1005. The encoder 1000 then down samples the input video frame 1005 using the down sampler module 1020 to form a down sample version of the input video frame 1005. The encoder 1000 compresses this down sampled frame using an intraframe compression module 1030 to generate the bit stream 1110. This bit stream 1110 is an approximation of the down sampled video frame 1005. The bit stream 1110 is buffered internally for computing of a bit error probability in the reconstructed frame. This bit stream 1110 is transmitted over, or stored in, the storage or transmission medium 1100 for decompression by the decoder 1200.

In the exemplary embodiment, the down sampler module 1020 comprises a down sampling filter with a cubic kernel. The default down sampling rate is two, meaning the resolution is reduced to one half of the original resolution in both the horizontal and vertical dimensions. A different down sampling rate may be defined by a user. Alternative down sampling methods may be employed by the down sampler module 1020, such as the nearest neighbour, bilinear, bi-cubic, and quadratic down sampling filters using various kernels such as Gaussian, Bessel, Hamming, Mitchell or Blackman kernels.

The compression method used by the intraframe compressor module 1030 may be baseline mode JPEG compression, compression according to the JPEG2000 standard, or compression according to the H.264 standard.

Figure 6:
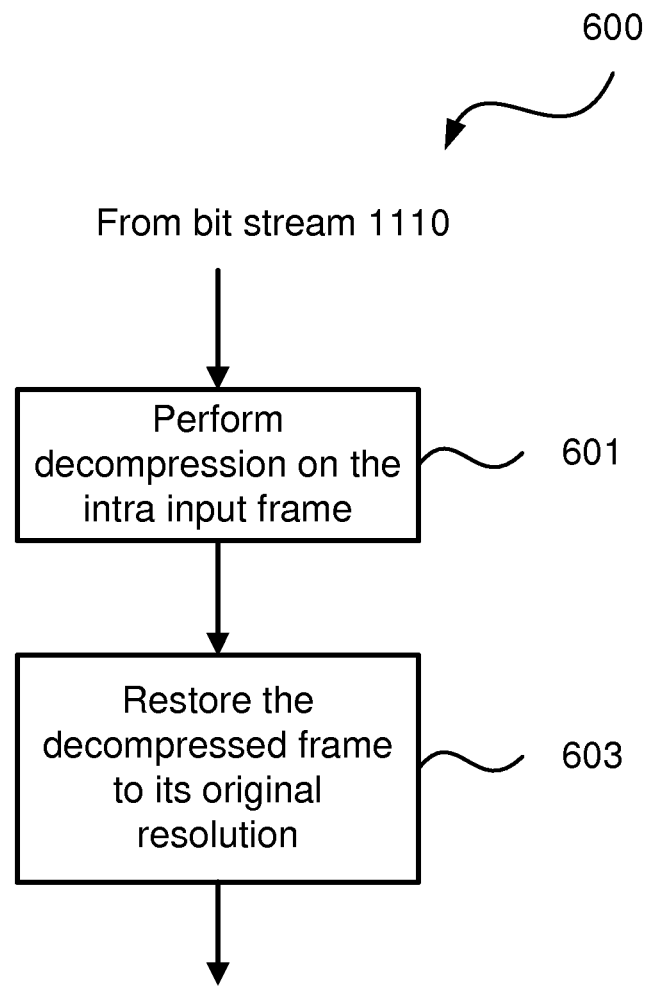
FIG. 6 is a flow diagram showing a method of generating an approximation of the original input frame.

To perform rate control at the encoder 1000, the previously buffered bit stream 1110 may be used to generate an approximation of the predicted frame at the decoder 1200 according to a method 600 which will now be described with reference to FIG. 6. The method 600 may be implemented as software in the form of an intraframe decompressor module 1040 and an up sampler module 1080. The software is preferably resident on the hard disk drive 410 and is controlled in its execution by the processor 405.

A method 600 of generating an approximation of video data representing the original input video frame 1005 using the bit stream 1110, will now be described with reference to FIG. 6. The method 600 begins at step 601, where the intraframe decompressor module 1040 reconstructs the down sample version of the original video frame 1005. At the next step 603, the reconstructed frame is up sampled by an up sampler module 1080 to restore the decompressed frame to its original resolution. The decompressed frame represents an approximation of the original video frame 1005. This approximation is then inputted to the video frame processor module 1016 and later to the encoder rate control module 1060 to determine the required bit rate for encoding the input video frame 1005.

Independently from the down sampling in the down sampler module 1020, one or more parts of the selected input video frame 1005 are encoded to form the bit stream 1120. A method 700 of encoding the input video frame 1005 will now be described with reference to FIGS. 1 to 7. The method 700 converts the input video frame 1005 to form a bit stream for turbo encoding. The method 700 may be implemented as software in the form of two video frame processor modules 1006 and 1016, two bit plane extractor modules 1010 and 1050, a turbo encoder module 1015, an encoder rate controller module 1060, and a database module 1070. The modules 1006 and 1016 are substantially identical. Further, the modules 1010 and 1050 are substantially identical. The software is preferably resident on the hard disk drive 410 and is controlled in its execution by the processor 405.

Figure 7:
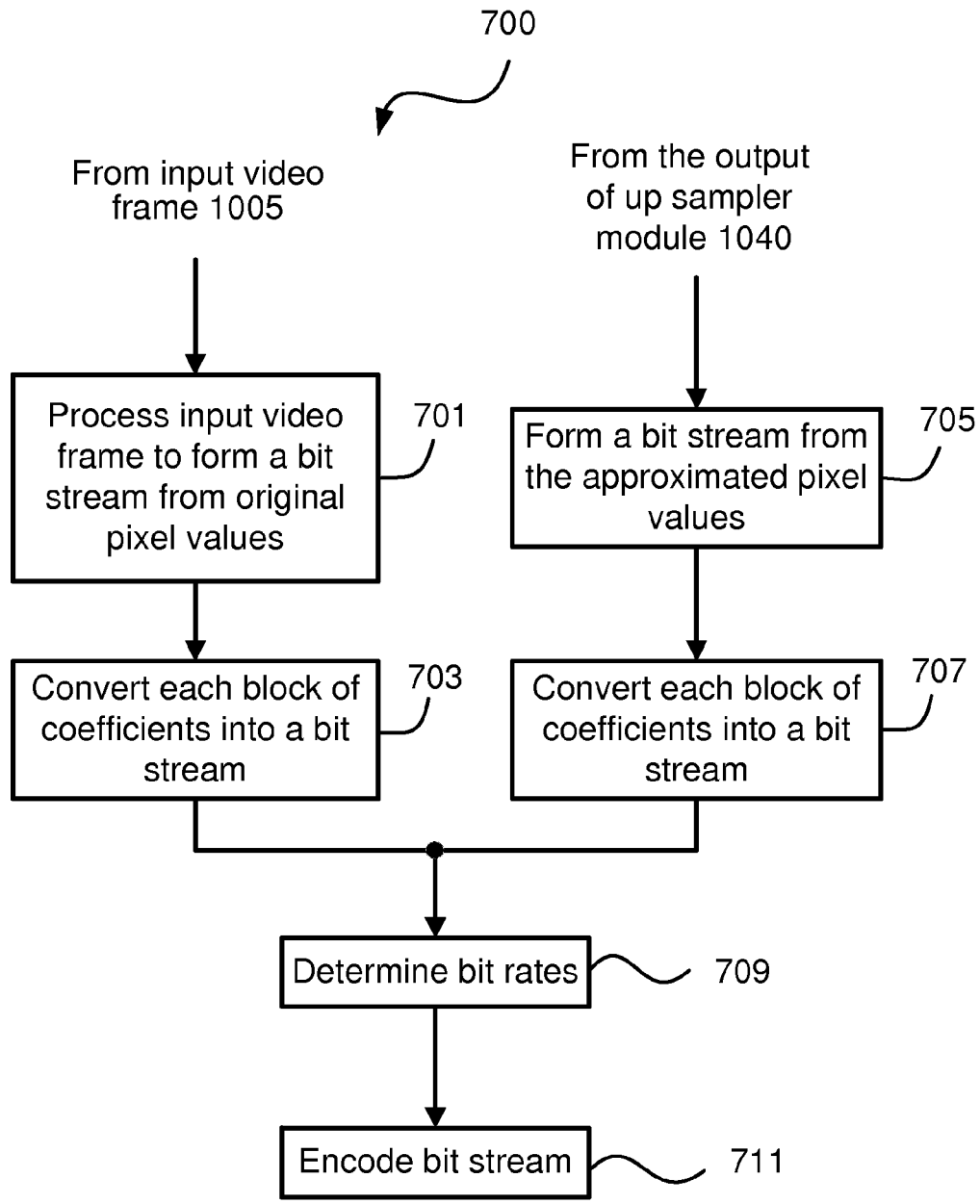
FIG. 7 is a flow diagram showing a method of encoding an input video frame.

As shown in FIGS. 1 and 7, the method 700 begins at the first step 701, where the input video frame 1005 is firstly processed by a video frame processor module 1006 to form a bit stream from original pixel values of the input video frame 1005. The module 1006 may partition video data representing original pixels of the input video frame 1005 into one or more blocks of pixels. The pixels of each block of pixels may then be scanned by the module 1006 in an order representing the spatial positions of the pixels in the block. For example, the pixels of each block may be scanned 'scanline by scanline', 'column by column' or in a 'raster scan order' (i.e., in a zig-zag order) from the top to the bottom of the block of pixels. The module 1006 produces a bit stream which is highly correlated with the original pixels of the input video frame 1005.

The bit stream is input to a bit plane extractor module 1010 where, at the next step 703, each block of coefficients is converted into a bit stream 2000. The bit plane extractor module 1010 performs the step of forming the bit stream 2000 for each block of coefficients of the bit stream output by the video frame processor module 1006. Preferably, scanning starts on the most significant bit plane of the video frame 1005. The most significant bits of the coefficients of the video frame 1005 are concatenated to form a bit stream containing only the most significant bits. In a second pass, the scanning concatenates the second most significant bits of all coefficients of the frame 1005. The bits from the second scanning path are appended to the bit stream generated in the previous scanning path. The scanning and appending continues in this manner until the least significant bit plane is completed. This generates one bit stream 2000 for each input video frame 1005. In the exemplary embodiment the module 1010 extracts every pixel in the bit stream output from the video frame processor module 1006.

In an alternative embodiment, not every pixel is processed. In this instance, the bit plane extractor module 1010 is configured to extract a specified subset of pixels within each bit plane to generate a bit stream containing bits for spatial resolutions lower than the original resolution.

In yet another alternative embodiment, the encoder 1000 may entropy encode a portion of the bit planes directly instead of generating parity bits using channel coding methods. For example, if a portion of a bit plane is made up of all ones or all zeros, those bits within the bit plane may be compressed more efficiently by run-length coding. Similarly, if a portion of a bit plane contains only a small number of ones or zeros, then arithmetic coding may be used to encode that portion of the bit plane.

Independent to steps 701 and 703, the approximation of the input video frame 1005 at the output of the up sampler module 1080 is processed by a video frame processor module 1016 at step 705. The video frame processor module 1016 is substantially identical to the module 1006. The module 1016 converts the pixel values of the approximation into a bit stream in the manner as described at step 701. The bit plane extractor module 1050 is substantially identical to module 1010. At step 707, the bit plane extractor module 1050 processes the output of the video frame processor module 1016 to form a bit stream 2001 by concatenating the more significant bit planes with the least significant bit planes in the manner described in step 703.

At the next step 709, the encoder rate controller module 1060 performs the step of determining bit rates for use in encoding video data representing the input video frame 1005. In order to determine the bit rates, the encoder rate controller module 1060 determines the bit error probabilities for each bit plane and for each coefficient band in the approximation of the original input video frame 1005. Based on the bit error probability, the encoder rate controller module 1060 consults the database module 1070 for a list of candidate bit rates to be used to encode the bit plane. The database module 1070 contains statistical information in relation to the correction capability of the turbo decoder module 1260 for different bit error probabilities. The different bit rates represent the amount of parity bits required for successful decoding at the decoder with different degrees of confidence. The encoder rate controller module 1060 performs the step of determining the most appropriate bit rate from this list depending on the significance of the bits in the coefficient values and the importance of the coefficient bands. This forms the bit stream 1130 and is inputted to the turbo encoder module 1015 to control the bit rate.

In the exemplary embodiment, if the chosen bit rate is larger than or equal to one bit per input bit, there are a significant number of bit errors in the bit plane and those bit errors cannot be corrected efficiently by the turbo decoder module 1260. The rate controller module 1060 may instruct the turbo encoder module 1015 not to generate any parity bits to improve the rate-distortion performance of the system 100.

In an alternative embodiment, if the chosen bit rate is larger than or equal to one bit per input bit, the encoder 1000 may send raw pixel data directly to the storage or transmission medium 1100.

Figure 8:
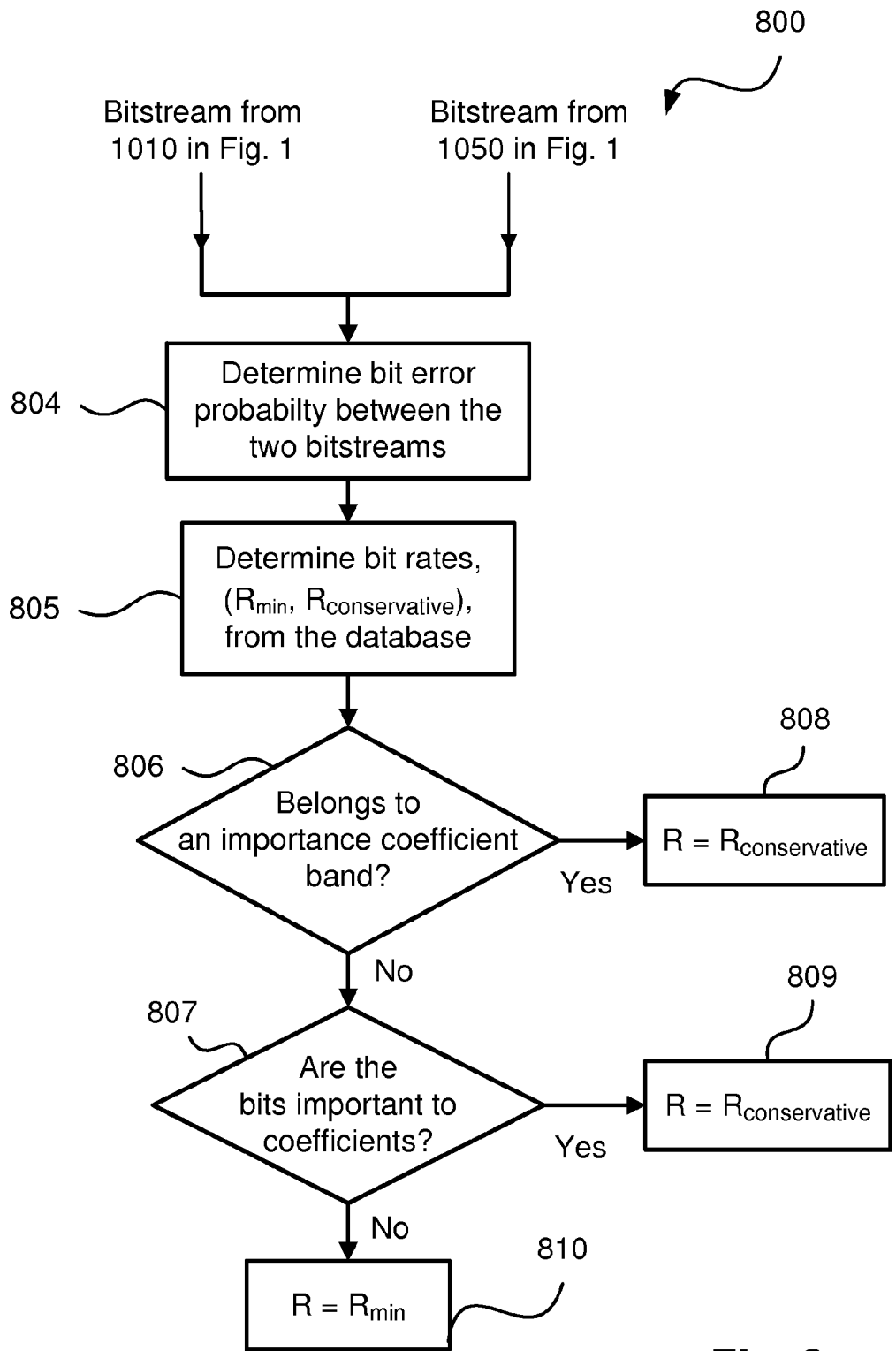
FIG. 8 is a flow diagram showing a method of determining bit rates, as executed in the method of FIG. 7.

A method 800 of determining bit rates for use in encoding video data representing the input video frame 1005, as executed at step 709 of the method 700, will be described in detail below with reference to FIG. 8.

At the next step 711, the bit stream 2000 output from the bit plane extractor module 1010 is encoded in a turbo coder module 1015 to produce the bit stream 1120 containing the parity information at the rate given by the encoder rate controller module 1060. As described below, the bit stream 1120 may be referred to as a "punctured" parity bit stream. The turbo encoder module 1015 performs the steps of encoding the bit stream 2000 after processing by the bit plane extractor module 1010 to generate parity bits from the bit stream 2000 according to a bitwise error correction method. For each bit plane of the input video frame 1005 parity bits are generated. Accordingly, if the bit depth of the input video frame 1005 is eight, then eight sets of parity bits are produced of which each parity bit set refers to one bit plane only. These bit streams 1120 and 1130 are transmitted over, or stored in, the storage or transmission medium 1100 for decompression by the decoder 1200.

The encoder 1000 thus forms three bit streams 1110, 1120, and 1130, all derived from the same input video frame 1005. These bit streams 1110, 1120, and 1130 may be multiplexed into a single bit stream, which is then stored in, or transmitted over the storage or transmission medium 1100.

An overview of the operation of the decoder 1200 is described below. The decoder 1200 receives three inputs; the first input is the punctured parity bit stream 1120 from the turbo coder module 1015, the second input is the bit stream 1110 from the intraframe compressor module 1030, and the third input is the bit stream 1130 from the encoder rate controller module 1060.

Bit stream 1110 is processed by an intraframe decompressor module 1240 which performs the inverse operation to the intraframe compressor module 1030. The intraframe decompressor module 1240 restores an approximation of the down sample version of the input video frame 1005. This approximation of the down sample version of the input video frame 1005 is then up sampled by the up sampler module 1250. Preferably a cubic filter is used by the module 1250 during the up sampling. The up sampling method used by the sampler module 1250 does not have to be the inverse of the down sampling method used by the down sampler module 1020. For example, a bilinear down sampling method may be used by the down sampler module 1020 and a cubic up sampling may be used by the up sampler module 1250. The output from the up sampler module 1250 is an estimate of the input video frame 1005 and is input to a bit plane extractor module 1280. In the exemplary embodiment, the bit plane extractor module 1280 is substantially identical to the bit plane extractor module 1010 of the encoder 1000. The output from the bit plane extractor module 1280 may be stored in a buffer (not shown) associated with the decoder 1200. Such a buffer may be configured, for example, within the hard disk drive 410.

The decoder 1200 further comprises a turbo decoder module 1260, which is described later in detail with reference to FIG. 3. The turbo decoder 1260 operates on each bit plane in turn to correct at least a portion of that (current) bit plane. In a first iteration the turbo decoder module 1260 receives the rate control information from bit stream 1130. The module 1260 then constructs parity bits for a first (most significant) bit plane from the punctured parity bit stream 1120. The turbo decoder 1260 also receives the first bit plane from the bit plane extractor 1280 as side information. The turbo decoder module 1260 uses the parity bits for the first bit plane to improve the first bit plane of the approximation of the input video frame 1005. The turbo decoder module 1260 outputs a decoded first bit plane. The turbo decoder 1260 repeats similar steps for lower bit planes until all bit planes are decoded.

The frame reconstruction module 1290 reconstructs the pixel values of the decoded bit stream as received from the turbo decoder module 1260. In the exemplary embodiment, the most significant bits of the coefficients of the input video frame 1105 are first decoded by the turbo decoder module 1260. The most significant bits of the coefficients are then concatenated with second most significant bits of the coefficients as the decoder 1200 generates those bits. The turbo decoder module 1260 then repeats similar steps for lower bit planes until all bit planes are decoded. In other embodiments, the frame reconstruction module 1290 may use the output of the up sampler module 1250 and the information produced by the turbo decoder module 1260 to obtain a better estimate of the pixel values. The pixel values are then de-interleaved by the frame reconstruction module 1290, and the result is the output video frame 1270, which is the final approximation of the input video frame 1005.

The down sampler module 1020 reduces the spatial resolution of the input video frame 1005. In the exemplary embodiment, the down sampler module 1020 uses the bi-cubic down sampling method, and the input video frame 1005 is reduced to one half of the original resolution in both the horizontal and vertical dimensions by default. Alternative down sampling methods may be used by the down sampler module 1020, such as the nearest neighbour, bilinear, bi-cubic, and quadratic down sampling filters using various kernels such as Gaussian, Bessel, Hamming, Mitchell or Blackman kernels.

Intraframe coding refers to various lossless and lossy compression methods that are performed relative to information that is contained only within the current frame, and not relative to any other frame in the video sequence. Common intraframe compression techniques include baseline mode JPEG, JPEG-LS, and JPEG 2000. In the exemplary embodiment, an implementation of lossy JPEG compression is used by the intraframe compressor module 1030. JPEG quality factor may be set to eighty-five (85) by default and can be re-defined between zero (0) (low quality) and one hundred (100) (high quality) by a user. The higher the JPEG quality factor, the smaller is the quantization step size, and hence the better is the approximation of the original video frame after decompression at the cost of a larger compressed file. In addition, in the exemplary embodiment, every input video frame 1005 is a key frame, and hence each input video frame 1005 is processed by intraframe compression module 1030. In an alternative embodiment, only every fifth one of the input video frames are key frames and are processed by the intraframe compression module 1030.

The video frame processor module 1006 forms a bit stream from original pixel values of the input video frame 1005, such that groups of bits in the bit stream are associated with clusters of spatial pixel positions in the input video frame 1005. In the exemplary embodiment, the video processor module 1006 scans the frame 1005 in a raster scanning order, visiting each pixels of the frame 1005. In alternative embodiments, the scanning path used by the video processor module 1006 may be similar to the scanning path employed in JPEG 2000.

In yet another alternative embodiment, the video processor module 1006 does not visit every pixel of the frame 1005 during scanning. In this instance, the video processor module 1006 is configured to extract a specified subset of pixels within each bit plane of the frame 1005 to generate parity bits for spatial resolutions lower than the original resolution.

In the exemplary embodiment, the bit plane extractor module 1010 starts the scanning on the most significant bit plane of the input video frame 1005 and concatenates the most significant bits of the coefficients of the input video frame 1005, to form a bit stream containing the most significant bits. In a second pass, the bit plane extractor module 1010 concatenates the second most significant bits of all coefficients of the input video frame 1005. The bits from the second scanning path are appended to the bit stream generated in the previous scanning path. The bit plane extractor module 1010 continues the scanning and appending in this manner until the least significant bit plane is completed, so as to generate one bit stream 2000 for each input video frame 1005.

The intraframe decompressor module 1040 performs the inverse operation to the intra-frame compressor module 1030. In the exemplary embodiment, the intraframe decompressor module 1040 is substantially identical to the intraframe decompressor module 1240 of the decoder 1200. Hence the approximation of the down sampled frame at the encoder 1000 is effectively identical to that of the decoder 1200. In an alternative embodiment, the intraframe decompressor module 1040 can be a simpler version of the intraframe decompressor module 1240, making fast decoding possible at the expense of lower visual quality of the decoded frame.

The up sampler module 1080 performs the inverse operation to the down sampler module 1020 of FIG. 1. The up sampler module 1080 restores the approximation of the down sampled frame outputted by the intraframe decompressor module 1040 to its original resolution. Accordingly, the module 1030, 1040 and 1080 perform the step of generating an approximation of the video data representing the input video frame 1005. In the exemplary embodiment, the up sampler module 1080 is substantially identical to the up sampler module 1250 of the decoder 1200 to generate an accurate approximation of the predicted frame.

In an alternative embodiment, the up sampler module 1080 may employ a fast up sampling method to improve the encoder efficiency. One such fast up sampling method is to replicate the pixel data from the down sampled frame. Alternatively, a bi-linear or bi-cubic up sampling method may be used by the up sampler module 1080.

The database module 1070 may be configured within a storage device such as the hard disk drive 410 or other physical memory. The database module 1070 contains statistical information in relation to correction capacity of the turbo decoder module 1260 for different bit error probabilities. The statistical information can be generated from real or computer generated data and can be arranged in the form of look up tables or as a set of arithmetic functions, which allow fast random access to the statistical information. The database module 1070 returns one or more bit rates for a given bit error probability from the encoder rate controller module 1060. The different bit rates represent the amount of parity bits required for successful decoding at the decoder 1200 with different degrees of confidence. In the exemplary embodiment, the database module 1070 returns two bit rates, $R_1$ and $R_2$. $R_1$ is a less conservative bit rate estimate configured to optimize rate distortion performance of the system 100. $R_2$ is a more conservative estimate (i.e., $R_1=R_2$) configured to improve the probability of successful decoding.

A method 800 of determining bit rates for use in encoding video data representing the input video frame 1005, as executed by the encoder rate controller module 1060 at step 709 of the method 700, will now be described in detail with reference to FIG. 8. The method 800 performs steps for determining the bit rates depending on bit error probabilities, bit planes and coefficient bands. The bit rates may be used for performing rate control.

The method 800 may be implemented as software in the form of the encoder rate controller module 1060, in the exemplary embodiment. The software is preferably resident on the hard disk drive 410 and is controlled in its execution by the processor 405.

The method 800 used by the encoder rate controller module 1060 begins at step 804, where the encoder rate controller module 1060 performs the step of determining the bit error probability between a set of bits (i.e., a portion) of the bit stream 2000 output from the bit plane extractor 1010 and the bit stream 2001. The two bitstreams 2000 and 2001 were derived from video representing the original input video frame 1005 and the previously buffered approximation bit stream 1110. At step 805, the encoder rate controller module 1060 consults the database module 1070 for the error correction capability of the turbo decoder module 1260 for the determined bit error probability. In the exemplary embodiment, the database module 1070 returns $R_{min}$ and $R_{conservative}$ as candidate bit rates for encoding the set of bits of the bit stream 2000 from module 1010 at step 805. In an alternative embodiment, the database module 1070 returns one or more candidate bit rates for encoding the set of bits of the bit stream 2000 from module 1010.

At the next step 806, the encoder rate controller module 1060 determines whether the set of bits in the bit stream 2000 belong to an important coefficient band. If the set of bits are part of an important coefficient band, then the method 800 proceeds to step 808. At step 808, a conservative bit rate, $R_{conservative}$, is selected by the encoder rate controller 1060 for encoding the set of bits.

If the set of bits are not part of an important coefficient band, then the method 800 continues to step 807. At step 807, the encoder rate controller module 1060 determines whether the set of bits are considered as important for the corresponding coefficient band. If the set of bits are important, the method 800 proceeds to step 809. At step 809, a conservative bit rate, $R_{conservative}$, is selected by the encoder rate controller module 1060 for encoding the set of bits. Otherwise, the method 800 proceeds to step 810, where a minimum bit rate, $R_{min}$, is selected by the encoder rate controller module 1060 for encoding the set of bits, in order to minimize the bit rate.

Figure 2:
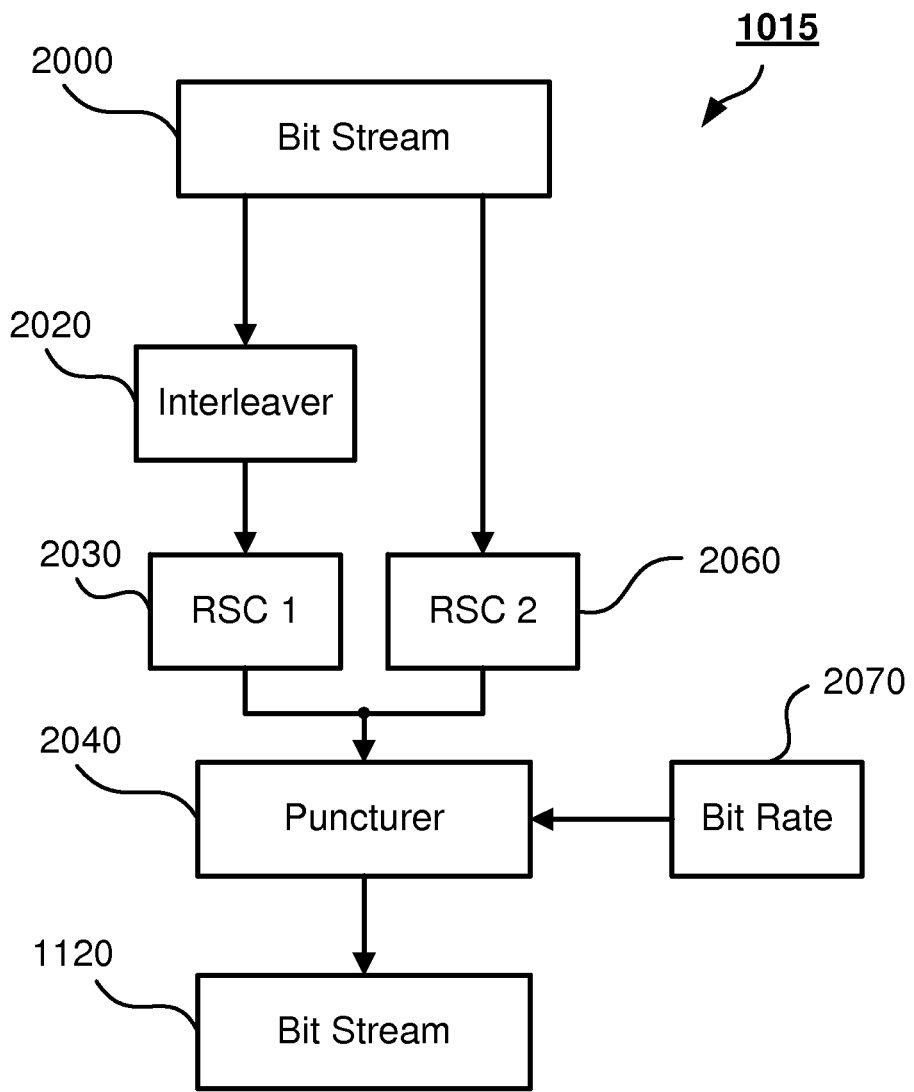
FIG. 2 shows a schematic block diagram of a turbo coder of the system of FIG. 1.

FIG. 2 shows a schematic block diagram of the turbo encoder module 1015. The turbo encoder module 1015 encodes the bit stream 2000 (i.e., the information bit stream) output from the bit plane extractor 1010 according to a bit-wise error correction method. The turbo coder module 1015 receives as input the bit stream 2000 from the bit plane extractor 1010. An interleaver module 2020 of the turbo coder module 1010 interleaves the bit stream 2000. In the exemplary embodiment, the interleaver module 2020 is a block interleaver. However, in alternative embodiments any other interleaver known in the art, for example a random or pseudo-random interleaver, or a circular-shift interleaver, may be used.

The output from the interleaver module 2020 is an interleaved bit stream, which is passed on to a recursive systematic coder module (RSC 1) 2030 which produces parity bits. One parity bit per input bit is produced. In the exemplary embodiment the recursive systematic coder module 2030 is generated using the octal generator polynomials 7 (binary $111_2$) and 5 (binary $101_2$).

A second recursive systematic coder module (RSC 2) 2060 operates directly on the bit stream 2000 from the bit plane extractor module 1010. In the exemplary embodiment the recursive systematic coder modules 2030 and 2060 are substantially identical. Both recursive systematic coder modules 2030 and 2060 output a parity bit stream to a puncturer module 2040, with each parity bit stream being equal in length to the input bit stream 2000.

The puncturer module 2040 deterministically deletes parity bits to reduce the parity bit overhead previously generated by the recursive systematic coder modules 2030 and 2060. The puncturer module 2040 may employ "half-rate" codes to reduce the parity bit overhead, which means that half the parity bits from each recursive systematic encoder module 2030 and 2060 are punctured. In the exemplary embodiment, the puncturer module 2040 receives bit rate control information 2070 from the encoder rate controller module 1060. The bit rate control information identifies the positions of the parity bits in a bit stream to be punctured.

The turbo coder module 1015 produces as output the punctured parity bit stream 1120, which comprises parity bits produced by recursive systematic coder modules 2060 and 2030.

Figure 3:
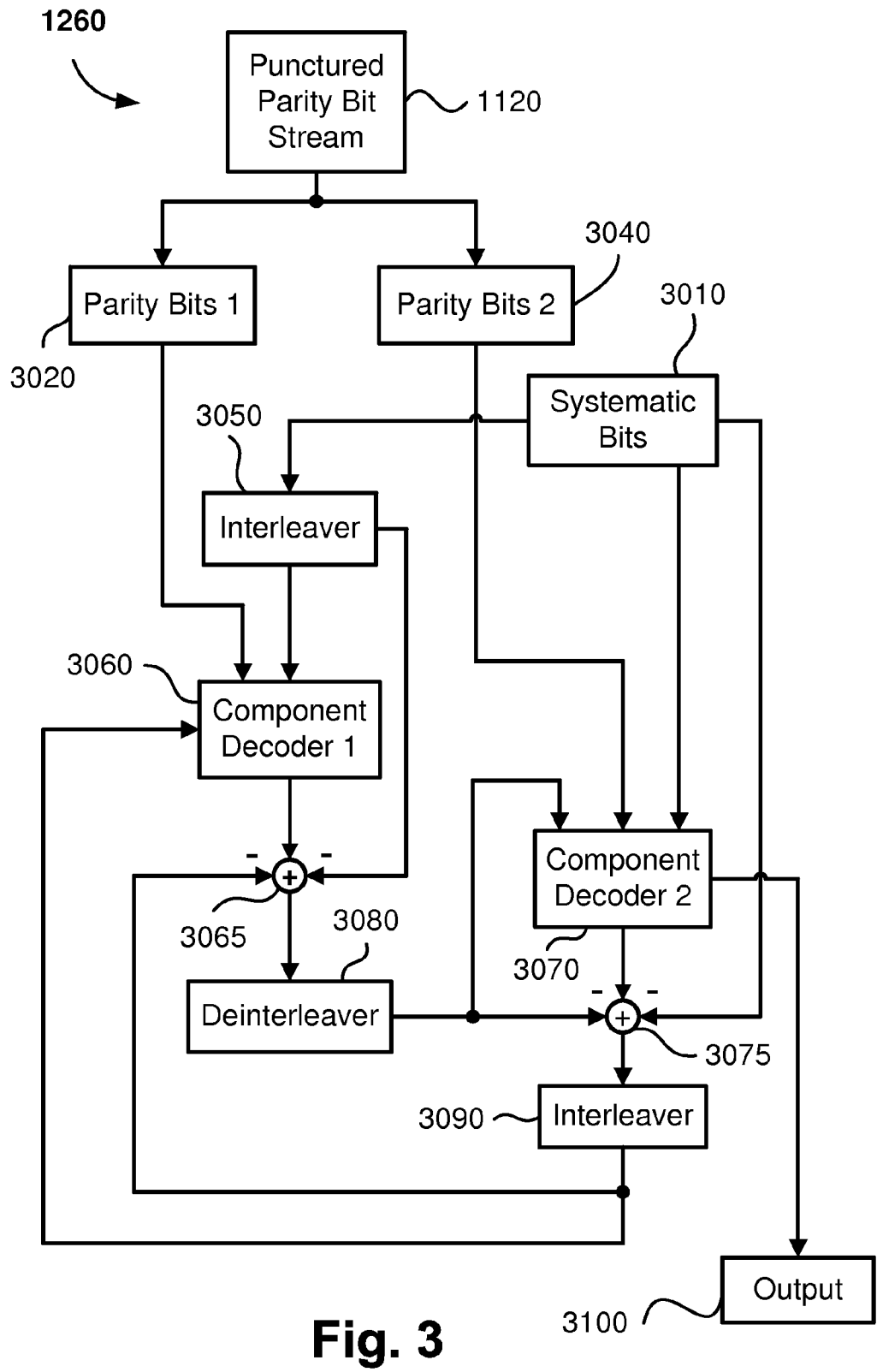
FIG. 3 shows a schematic block diagram of a turbo decoder of the system of FIG. 1.

FIG. 3 shows a schematic block diagram of the turbo decoder module 1260. Parity bits in the punctured parity bit stream 1120 are split into two sets of parity bits: one set for the parity bits 3020 originating from the recursive systematic coder module 2030 (FIG. 2) and one set of parity bits 3040 originating from the recursive systematic coder module 2060 (FIG. 2) according to rate control information from the bit stream 1130.

The parity bits 3020 are then input to a component decoder module 3060, which preferably processes the parity bits according to the "Soft Output Viterbi Decoder (SOYA)" algorithm. Alternatively, a "Max-Log Maximum A Posteriori Probability (MAP)" algorithm may be employed by the component decoder module 3060. In yet another alternative embodiment, variations of the SOYA or the MAP algorithms may be used.

Systematic bits 3010 from the bit plane extractor module 1280 are passed as input to an interleaver module 3050. This interleaver module 3050 is also linked to the component decoder module 3060. In a similar manner, parity bits 3040 are input to a component decoder module 3070, together with the systematic bits 3010.

As can be seen in FIG. 3, the turbo decoder module 1260 works iteratively. A loop is formed starting from the component decoder module 3060, to an adder 3065, to a deinterleaver module 3080, to a second component decoder module 3070, to adder 3075, to interleaver module 3090 and back to component decoder module 3060.

The component decoder module 3060 takes three inputs; the parity bits 3020, the interleaved systematic bits 3010 from the interleaver module 3050 and output from the second component decoder module 3070 which has been modified in adder 3075 and interleaved in the interleaver module 3090. The input from the second component decoder module 3070 to the other component decoder module 3060 provides information about the likely values of the bits to be decoded. This information is typically provided in terms of Log Likelihood Ratios $$L(u_k) = \ln\left(\frac{P(u_k = +1)}{P(u_k = -1)}\right),$$

where $P(u_k=+1)$ denotes the probability that the bit $u_k$ equals +1 and where $P(u_k=-1)$ denotes the probability that the bit $u_k$ equals −1.

In a first iteration, the feedback input from the second component decoder 3070 does not exist. Therefore, in the first iteration the feedback input from the second component decoder 3070 is set to zero.

A decoded bit sequence produced by the first component decoder module 3060 is passed on to adder 3065 where the so called a priori information related to the bit stream 1120 is produced. The received systematic bits 3010 are extracted in adder 3065 and information produced by the second component decoder module 3070 (which are processed analogously in adder 3075 and interleaved in interleaver module 3090) is extracted as well. Left over is the a priori information which provides the likely value of a bit. This a priori information is valuable for the next iteration of the component decoder module 3060.

After processing by the adder 3065, a resulting bit stream is de-interleaved in deinterleaver module 3080, which performs the inverse action of interleaver module 3050. The de-interleaved bit stream from deinterleaver module 3080 is provided as input to the second component decoder module 3070. In the exemplary embodiment, the second component decoder module 3070 as well as adder 3075 works analogously to the first component decoder module 3060 and adder 3065 already described. A resulting bit stream is again interleaved in interleaver 3090 and used as input for the second iteration to the first component decoder module 3060.

In the exemplary embodiment, eight iterations between the first component decoder module 3060 and the second component decoder module 3070 are performed. After completion of eight iterations the resulting decoded bit stream produced from component decoder module 3070 is output 3100.

Figure 5:
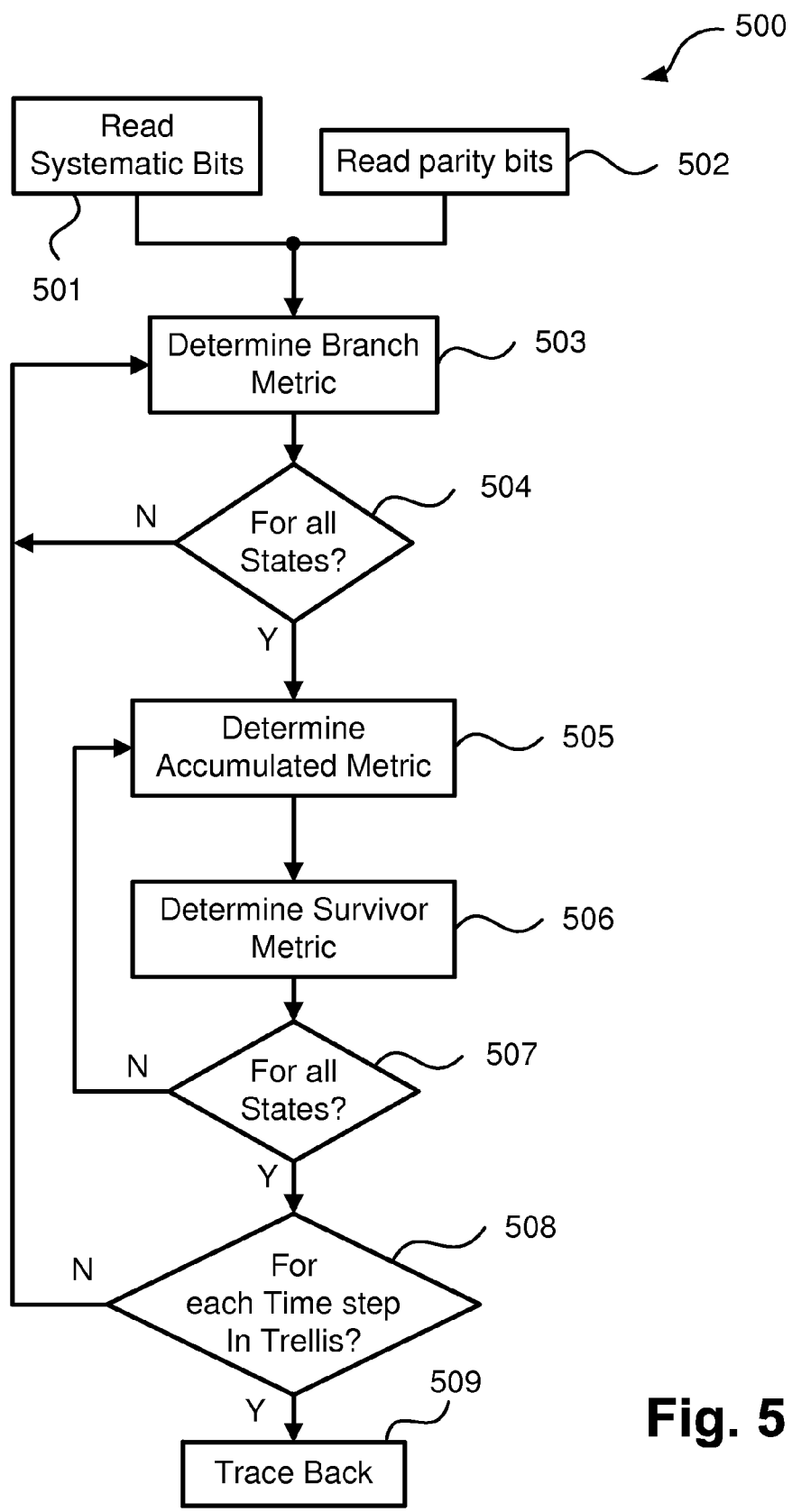
FIG. 5 shows a schematic flow diagram of a method of processing parity bits as performed in a component decoder of the turbo decoder of FIG. 3.

A method 500 of processing parity bits as executed by the component decoder module 3060, will now be described with reference to FIG. 5. Again, the method 500 may be implemented as software in the form of the component decoder module 3060.

As described above, in the exemplary embodiment the two component decoder modules 3060 and 3070 need not be identical. However, in the exemplary embodiment the component decoder modules 3060 and 3070 are substantially identical. The component decoder module 3060 commences operation by reading the systematic bits 3010 (FIG. 3) in step 501. As noted above, the systematic bits 3010 are the output of the up sampler module 1250 after bit plane extraction (FIG. 1).

At the next step 502, the component decoder module 3060 reads the parity bits 3020 (FIG. 3). Processing continues at the next step 503, where a "branch metric" is determined. The branch metric is a measure of the decoding quality for a current code word. The branch metric is equal to zero if the decoding of the current code word is error free. However, code word decoding errors can sometimes occur and can still result in an overall optimal result.

The determination of the branch metric is performed at step 503 by getting feedback from the other component decoder module 3070 (FIG. 3) in the form of log likelihood ratios as described above. The log likelihood ratios, and as such the calculation of the branch metrics, is based on a model of the noise to be expected on the systematic bits 3010 (FIG. 3). In the exemplary embodiment, the "Laplace noise model" is employed by the component decoder module 3060 to compensate for errors in the systematic bits 3010.

The noise to be expected on the systematic bits 3010 originates from a JPEG compression and the down and up sampling performed by the encoder 1000 and decoder, respectively. Modelling this noise is generally difficult as reconstruction noise is generally signal dependent (e.g., Gibbs phenomenon) and spatially correlated (e.g., JPEG blocking). This means that in general the errors are not independently, identically distributed. However, channel coding techniques (e.g., turbo codes) assume independent, identically distributed noise.

Even though the magnitude of unquantized DC coefficients of the DCT coefficients are generally Gaussian distributed, the magnitude of unquantized AC coefficients are best described by a Laplacian distribution. Further, quantizing coefficients decrease the standard variation of those Laplacian distributions. This means that noise on DC coefficients may be modelled as Gaussian noise, and the noise on AC coefficients may be modelled as Laplace noise. The channel coding techniques make the assumption that the noise is additive Gaussian white noise. Accordingly, the component decoder module 3060 preferably employs a modified channel coding techniques.

As is evident from FIG. 1, the systematic bits 3010 used in the determination of the branch metric in step 503 originate from a spatial prediction process through the up sampling performed in the up sampler module 1250.

Referring again to FIG. 5, the method 500 continues at the next step 504, where if the component decoder module 3060 determines that all states of a trellis diagram have been processed, then processing returns to step 503. Otherwise, if the branch metrics for all states have been determined, then the method 500 continues to step 505 where an accumulated metric is determined. The accumulated metric represents the sum of previous code word decoding errors, which is the sum of previous branch metrics.

In the next step 506, the component decoder module 3060 determines a survivor path metric. The survivor path metric represents the lowest overall sum of previous branch metrics and indicates the optimal decoding up to date.

Next, in step 507, if the component decoder module 3060 determines that all states have been processed, then the method 500 proceeds to step 508. Otherwise, if states remain for processing, then the method 500 returns to step 505. Once the branch metrics, the accumulated metric and the survivor path metrics have been determined, processing continues for a next time step in the trellis diagram in step 508. Once the survivor metric is determined for all nodes in the trellis diagram, the method 500 proceeds to step 509. At step 509, the component decoder module 3060 determines a trace back. The trace back uses the obtained knowledge of the best decoding metric (i.e., indicating the decoding quality) to generate the decoded bit stream output from the component decoder module 3060.

The frame reconstruction module 1290 reconstructs the pixel values from the decoded bit stream output by the turbo decoder module 1260. In the exemplary embodiment, the most significant bits of the coefficients of the output video frame 1270 are first determined by the turbo decoder module 1260. The second most significant bits of the coefficients of the frame 1270 are then determined and concatenated with the first most significant bits. This process repeats for lower bit planes until all bits are determined for each of the bit planes of the frame 1270.

The foregoing describes only some embodiments of the present invention, and modifications and/or changes can be made thereto without departing from the scope and spirit of the invention, the embodiments being illustrative and not restrictive.

For example, instead of processing the same input video frame 1005 in order to produce the bitstreams 1110, 1120, and 1130, in an alternative embodiment the bitstream 1110 may be formed from a key frame of the input video frame 1005, whereas bitstreams 1120 and 1130 are formed from non-key frames. In such an embodiment the data output from the up sampler module 1250 is then an estimate of the non-key frames, and the turbo decoder module 1260 uses the parity data from the bitstream 1120 to correct the estimate.

The methods describe above are computationally less expensive than conventional methods and allow rate control to be performed with no feedback channel or motion estimation. The implementation of the above methods also allows faster encoding to be performed.

In the context of this specification, the word "comprising" means "including principally but not necessarily solely" or "having" or "including", and not "consisting only of". Variations of the word "comprising", such as "comprise" and "comprises" have correspondingly varied meanings.

The claims defining the invention are as follows:

1. A computer-implemented method of determining, in an encoder, a bit rate for use in encoding video data for joint decoding, said method comprising:
    generating an approximation of the video data as frequency coefficients by compressing the video data for later use as side information during a process of joint decoding;
    determining, in the encoder, a bit error probability for a bit plane of the approximation;
    determining, in the encoder, a conservative bit rate and a minimum bit rate, each of the bit rates being determined according to the determined bit error probability; and
    selecting, in the encoder, either the conservative bit rate or the minimum bit rate as the bit rate for encoding the bit plane in accordance with an importance of a frequency coefficient band of the frequency coefficients of the approximation, the determined bit rate being stored in a computer-readable medium,
    wherein the conservative and minimum bit rates each represent an amount of parity bits for use in decoding the encoded bit plane, the conservative bit rate representing a larger amount of parity bits as compared to the minimum bit rate.

2. The method according to claim 1, further comprising converting pixel values of the approximation into a bitstream.

3. The method according to claim 1, further comprising determining the bit error probabilities between a set of bits of two bitstreams.

4. The method according to claim 3, wherein one of the two bitstreams is the approximation.

5. The method according to claim 3, wherein one of the two bitstreams is the video data.

6. The method according to claim 1, wherein the conservative bit rate is selected from a database of candidate bit rates based on the determined bit error probabilities.

7. The method according to claim 6, wherein the database contains statistical information for different bit error probabilities.

8. The method according to claim 1, further comprising selecting the conservative bit rate depending on significance of bits in the frequency coefficient band.

9. The method according to claim 1, wherein the selected bit rate represents an amount of parity bits required for decoding the video data.

10. The method according to claim 1, further comprising entropy encoding at least a portion of the bit plane, depending on the bit rates.

11. The method according to claim 9, wherein a portion of the bit plane is raw data depending on the bit rates.

12. An apparatus for determining a bit rate for use in encoding video data for joint decoding, said apparatus comprising:
    means for generating an approximation of the video data as frequency coefficients by compressing the video data for later use as side information during a process of joint decoding;
    means for determining, in an encoder, a bit error probability for a bit plane of the approximation;
    means for determining, in the encoder, a conservative bit rate and a minimum bit rate, each of the bit rates being determined according to the determined bit error probability; and
    means for selecting, in the encoder, either the conservative bit rate or the minimum bit rate as the bit rate for encoding the bit plane in accordance with an importance of a frequency coefficient band of the frequency coefficients of the approximation,
    wherein the conservative and minimum bit rates each represent an amount of parity bits for use in decoding the encoded bit plane, the conservative bit rate representing a larger amount of parity bits as compared to the minimum bit rate.

13. A non-transitory computer-readable medium, having a program recorded thereon, where the program is configured to make a computer execute a method for determining, in an encoder, a bit rate for use in encoding video data for joint decoding, said method comprising:
    code for generating an approximation of the video data as frequency coefficients by compressing the video data for later use as side information during a process of joint decoding;
    code for determining, in the encoder, a bit error probability for a bit plane of the approximation;
    code for determining, in the encoder, a conservative bit rate and a minimum bit rate, each of the bit rates being determined according to the determined bit error probability; and
    code for selecting, in the encoder, either the conservative bit rate or the minimum bit rate as the bit rate for encoding the bit plane in accordance with an importance of a frequency coefficient band of the frequency coefficients of the approximation,
    wherein the conservative and minimum bit rates each represent an amount of parity bits for use in decoding the encoded bit plane, the conservative bit rate representing a larger amount of parity bits as compared to the minimum bit rate.

14. A system for determining, in an encoder, a bit rate for use in encoding video data for joint decoding, said system comprising:
    a memory for storing data and a computer program; and
    a processor coupled to said memory for executing said computer program, said computer program comprising instructions for effecting a method comprising:

(1) generating an approximation of the video data as frequency coefficients by compressing the video data for later use as side information during a process of joint decoding;
(2) determining, in an encoder, a bit error probability for a bit plane of the approximation;
(3) determining, in the encoder, a conservative bit rate and a minimum bit rate, each of the bit rates being determined according to the determined bit error probability; and
(4) selecting, in the encoder, either the conservative bit rate or the minimum bit rate as the bit rate for encoding the bit plane in accordance with an importance of a frequency coefficient band of the frequency coefficients of the approximation,
wherein the conservative and minimum bit rates each represent an amount of parity bits for use in decoding the encoded bit plane, the conservative bit rate representing a larger amount of parity bits as compared to the minimum bit rate.

15. The method according to claim 1, wherein the minimum bit rate is configured to optimize rate distortion performance.

16. The method according to claim 1, wherein the conservative bit rate is configured to improve probability of successful decoding.

17. The method according to claim 1, wherein the conservative and the minimum bit rates are stored in a look-up table.

18. A computer implemented method of determining, in an encoder, a bit rate for use in encoding video data for joint decoding, said method comprising:
generating an approximation of the video data as frequency coefficients by compressing the video data for later use as side information during a process of joint decoding;
determining, in the encoder, a bit error probability for a bit plane of the approximation;
determining, in the encoder, a first bit rate and a second bit rate, each of the bit rates being determined according to the determined bit error probability; and
selecting, in the encoder, either the first bit rate or the second bit rate as the bit rate for encoding the bit plane in accordance with an importance of a frequency coefficient band of the frequency coefficients of the approximation, the determined bit rate being stored in a computer readable medium,
wherein the first and second bit rates each represent an amount of parity bits for use in decoding the encoded bit plane, the conservative bit rate representing a larger amount of parity bits as compared to the minimum bit rate.

* * * * *